(12) United States Patent
Brimeyer et al.

(10) Patent No.: US 11,224,164 B2
(45) Date of Patent: Jan. 18, 2022

(54) DAMPED FLOAT RESPONSE ON AN AGRICULTURAL HARVESTER

(71) Applicant: Deere & Company, Moline, IL (US)

(72) Inventors: Alex Brimeyer, Bettendorf, IA (US); David E. Renner, Rock Island, IL (US); Praveen Kumar Singh, Pune (IN); Todd M. Verhoef, Davenport, IA (US)

(73) Assignee: Deere & Company, Moline, IL (US)

( * ) Notice: Subject to any disclaimer, the term of this patent is extended or adjusted under 35 U.S.C. 154(b) by 272 days.

(21) Appl. No.: 16/392,120

(22) Filed: Apr. 23, 2019

(65) Prior Publication Data

US 2020/0337239 A1  Oct. 29, 2020

(51) Int. Cl.
| | | |
|---|---|---|
| *A01D 41/14* | (2006.01) | |
| *A01D 41/127* | (2006.01) | |
| *A01B 63/00* | (2006.01) | |
| *A01B 63/108* | (2006.01) | |
| *F15B 13/04* | (2006.01) | |

(Continued)

(52) U.S. Cl.
CPC .......... *A01D 41/141* (2013.01); *A01B 63/008* (2013.01); *A01B 63/10* (2013.01); *A01B 63/108* (2013.01); *A01D 41/127* (2013.01); *A01D 41/145* (2013.01); *F15B 13/0401* (2013.01); *F15B 13/0402* (2013.01);
(Continued)

(58) Field of Classification Search
CPC .. F15B 21/087; F15B 21/005; F15B 13/0433; F15B 13/0402; F15B 13/0401; F15B 11/08; A01D 69/03; A01D 67/00; A01D 41/145; A01D 41/141; A01D 41/127; A01D 41/12; A01D 41/06; A01B 63/108; A01B 63/10; A01B 63/008
See application file for complete search history.

(56) References Cited

U.S. PATENT DOCUMENTS

| | | |
|---|---|---|
| 3,509,701 A | 5/1970 | Clarke |
| 3,953,959 A | 5/1976 | Decruyenaere |

(Continued)

FOREIGN PATENT DOCUMENTS

| | | |
|---|---|---|
| EP | 1264989 A1 | 12/2002 |
| FR | 2534771 A1 | 4/1984 |

OTHER PUBLICATIONS

Non-Final Office Action for U.S. Appl. No. 16/392,082 dated Apr. 15, 2021, 16 pages.

(Continued)

*Primary Examiner* — Arpad Fabian-Kovacs
(74) *Attorney, Agent, or Firm* — Christopher J. Volkmann; Kelly, Holt & Christenson, PLLC (57) ABSTRACT

A header assembly for an agricultural harvesting machine having a traction unit comprises a cutter, a main frame that supports the cutter, a float cylinder configured to be coupled between the main frame and the traction unit, an accumulator, and fluidic circuitry that fluidically couples the accumulator to the float cylinder. The fluidic circuitry is configured to provide a first flow of pressurized fluid under pressure to the float cylinder, so the float cylinder exerts a float force on the main frame, and, based on a control input that corresponds to a lifting operation of the header assembly, provide a restricted flow of fluid, that is restricted relative to the first flow, between the float cylinder and the accumulator.

20 Claims, 7 Drawing Sheets

(51) Int. Cl.
*A01B 63/10* (2006.01)
*F15B 21/00* (2006.01)
*F15B 13/043* (2006.01)
*F15B 11/08* (2006.01)
*F15B 21/08* (2006.01)

(52) U.S. Cl.
CPC .......... *F15B 11/08* (2013.01); *F15B 13/0433* (2013.01); *F15B 21/005* (2013.01); *F15B 21/087* (2013.01)

(56) References Cited

U.S. PATENT DOCUMENTS

| | | | |
|---|---|---|---|
| 4,718,325 A | 1/1988 | Shore | |
| 4,733,523 A | 3/1988 | Dedeyne et al. | |
| 4,825,655 A | 5/1989 | Buchl et al. | |
| 5,964,077 A | 10/1999 | Guinn | |
| 5,992,146 A | 11/1999 | Hausman | |
| 6,085,501 A * | 7/2000 | Walch | A01B 63/10 172/7 |
| 6,220,289 B1 | 4/2001 | Zenker et al. | |
| 6,263,977 B1 | 7/2001 | Mayerle et al. | |
| 6,647,721 B2 | 11/2003 | Heyne et al. | |
| 6,675,568 B2 | 1/2004 | Patterson et al. | |
| 6,901,729 B1 * | 6/2005 | Otto | A01D 41/145 56/208 |
| 6,973,779 B2 | 12/2005 | Naaktgeboren et al. | |
| 7,168,226 B2 | 1/2007 | McLean et al. | |
| 7,261,030 B2 | 8/2007 | Liberfarb et al. | |
| 7,555,883 B2 | 7/2009 | Fackler et al. | |
| 7,647,755 B2 | 1/2010 | Barnett et al. | |
| 7,661,251 B1 | 2/2010 | Sloan et al. | |
| 7,703,266 B2 | 4/2010 | Fackler et al. | |
| 7,707,811 B1 * | 5/2010 | Strosser | A01D 41/141 56/10.2 E |
| 7,793,740 B2 | 9/2010 | Thomson et al. | |
| 7,861,506 B2 | 1/2011 | Humbert | |
| 7,869,922 B2 | 1/2011 | Otto et al. | |
| 8,001,751 B2 | 8/2011 | Ehrhart et al. | |
| 8,401,745 B2 | 3/2013 | Otto et al. | |
| 8,572,938 B2 | 11/2013 | Deneault et al. | |
| 9,043,955 B2 | 6/2015 | Nafziger et al. | |
| 9,681,601 B2 | 6/2017 | Bassett | |
| 9,717,180 B2 * | 8/2017 | Teach | A01D 41/145 |
| 9,968,033 B2 | 5/2018 | Dunn et al. | |
| 2001/0002533 A1 * | 6/2001 | Rhody | A01D 41/145 56/10.2 E |
| 2003/0074876 A1 | 4/2003 | Patterson et al. | |
| 2006/0144028 A1 * | 7/2006 | McLean | A01D 41/141 56/10.4 |
| 2006/0150604 A1 | 7/2006 | Kieffer et al. | |
| 2011/0047946 A1 * | 3/2011 | Otto | F15B 13/044 56/10.2 E |
| 2014/0360174 A1 | 12/2014 | Sohn | |
| 2014/0373519 A1 | 12/2014 | Franzoni et al. | |
| 2016/0037721 A1 * | 2/2016 | Teach | F15B 21/087 60/328 |
| 2016/0316624 A1 | 11/2016 | Ritter et al. | |
| 2017/0191506 A1 | 7/2017 | Lacher et al. | |
| 2017/0215329 A1 * | 8/2017 | Lacher | F15B 13/0402 |
| 2017/0261009 A1 | 9/2017 | Paulessen et al. | |
| 2017/0359955 A1 * | 12/2017 | Dunn | A01D 41/141 |
| 2018/0153101 A1 * | 6/2018 | Dunn | A01B 63/008 |
| 2018/0153102 A1 * | 6/2018 | Dunn | A01D 41/127 |
| 2018/0180068 A1 | 6/2018 | Fukuda et al. | |
| 2018/0359920 A1 | 12/2018 | Dunn et al. | |
| 2019/0110404 A1 | 4/2019 | Vandeven et al. | |
| 2019/0191615 A1 | 6/2019 | Thompson | |
| 2019/0200523 A1 | 7/2019 | Fay, II et al. | |
| 2020/0077585 A1 | 3/2020 | Garbald et al. | |
| 2020/0305348 A1 | 10/2020 | Karst et al. | |
| 2020/0337240 A1 | 10/2020 | Brimeyer et al. | |
| 2020/0337241 A1 * | 10/2020 | Brimeyer | A01B 63/1013 |
| 2020/0344951 A1 | 11/2020 | Vandeven | A01D 41/141 |
| 2021/0063265 A1 * | 3/2021 | Smith | A01B 63/108 |

OTHER PUBLICATIONS

Restriction Requirement for U.S. Appl. No. 16/366,317 dated Apr. 9, 2021, 5 pages.
Application and Drawings filed for U.S. Appl. No. 16/366,317 dated Mar. 27, 2019, 34 pages.
Application and Drawings for U.S. Appl. No. 16/392,158, dated Apr. 23, 2019, 35 pages.
Application and Drawings for U.S. Appl. No. 16/392,082, dated Apr. 23, 2019, 31 pages.
Notice of Allowance received for U.S. Appl. No. 16/392,156 dated Aug. 10, 2021, 5 pages.
Non-Final Office Action for U.S. Appl. No. 16/392,156 dated May 13, 2021, 15 pages.
Response to Restriction Requirement filed for U.S. Appl. No. 16/366,317 dated Apr. 29, 2021, 2 pages.
Non-Final Office Acton for U.S. Appl. No. 16/366,317 dated Jun. 9, 2021, 10 pages.
Non-Final Office Action for U.S. Appl. No. 16/366,317 dated Sep. 7, 2021?, 2021, 8 pages.

* cited by examiner

DAMPED FLOAT RESPONSE ON AN AGRICULTURAL HARVESTER

FIELD OF THE DESCRIPTION

This description generally relates to agricultural equipment. More specifically, but not by limitation, the present description relates to a system for applying float pressure on the header of an agricultural harvester.

BACKGROUND

There is a wide variety of different types of agricultural equipment. Some such equipment includes agricultural harvesters.

It is common for agricultural harvesters (such as combine harvesters, forage harvesters, windrowers, etc.) to have a header. On an example combine, the header is attached to a feeder house by an attachment frame. The header has a main frame that supports a cutter bar and a reel. The main frame is movable relative to the attachment frame. As the harvester travels, the header engages crop, severs it and transfers the crop into the harvester for further processing.

On a windrower, the header has a main frame and a cutter that are movably attached to a traction unit. A lift cylinder is actuated to raise and lower the main frame and cutter relative to the traction unit, and thus relative to the ground. The main frame can also be pivotally attached so that it can be tilted, using a tilt actuator, such as a tilt cylinder.

The discussion above is merely provided for general background information and is not intended to be used as an aid in determining the scope of the claimed subject matter.

SUMMARY

A header assembly for an agricultural harvesting machine having a traction unit comprises a cutter, a main frame that supports the cutter, a float cylinder configured to be coupled between the main frame and the traction unit, an accumulator, and fluidic circuitry that fluidically couples the accumulator to the float cylinder. The fluidic circuitry is configured to provide a first flow of pressurized fluid under pressure to the float cylinder, so the float cylinder exerts a float force on the main frame, and, based on a control input that corresponds to a lifting operation of the header assembly, provide a restricted flow of fluid, that is restricted relative to the first flow, between the float cylinder and the accumulator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Harvester headers have a main frame that supports the header structure. Example agricultural harvesters include, but are not limited to, combine harvesters, forage harvesters, and windrowers, etc. The main frame is movable relative to a traction unit (such as a combine harvester or windrower traction unit) by a positioning actuator so the header can be positioned at a desired height relative to the ground (e.g., in order to float above the ground, and sometimes in order to set a tilt angle of the header as well).

It is believed that improved harvesting performance can be achieved when the header generally follows the surface of the ground, so that it maintains roughly the same distance above the ground throughout the harvesting operation.

In order to achieve better ground following performance, some harvesters are configured with a float assembly that applies a float force to the header. The float force is a lifting force (e.g., to the main frame relative to the traction unit) oriented to maintain the header at the given distance above the ground. This allows the header to respond to changing ground levels and to contact with obstacles to better follow the ground.

The header often has ground engaging elements which provide a ground reference input to the header. Therefore, if the ground underneath the header falls, the header is normally weighted sufficiently to overcome the float force so the main frame drops to follow the ground downward. If the ground under the header rises, then the ground engaging elements act to aid the float force in lifting the header (e.g., lifting the main frame) to follow the ground upward.

It is also not uncommon for there to be obstacles (such as dirt, root balls, rocks, or other obstacles) in the path of the harvester. When the header (or the ground engaging elements) contact an obstacle, this can impart a lifting force (or pulse) on the header as well. The float force allows the header to respond to the upwardly directed force, by rising up, and then settling back to its original position relative to the ground.

In some systems, a float cylinder is hydraulically coupled to an accumulator. The accumulator provides hydraulic fluid under pressure to the float cylinder, which, in turn, provides the lifting force. When an upwardly directed force is imparted on the header (such as when the header, or a ground engaging element of the header, strikes an obstacle on the ground) the header rises, assisted by the float force, and the float cylinder draws hydraulic fluid out of the accumulator. The header then falls back to its original position, because the weight of the header overcomes the upwardly directed float force (e.g., pressure in the accumulator). In some systems, the hydraulic circuit allows hydraulic fluid to freely flow through a hydraulic conduit between the float cylinder and the accumulator. This can present difficulties.

For instance, when the traction unit lifts the header assembly quickly, the attachment frame (in the case of a combine, for e.g.) rises quickly with respect to the main frame. When the main frame contacts a bottom end stop of the header, a large impact results which can be perceived by the operator of the traction unit and can damage the header and/or traction unit.

Further, during field transport across a terrain (i.e., the header is held in an elevated position off the ground) the main frame is supported by the bottom end stop. In some cases, as the traction unit traverses the terrain, a relatively severe upward directed force can be imparted on the main frame of the header, for example if the traction unit hits an obstacle. This force cases the main frame to rise off the bottom end stop, and then fall down quickly and impact the bottom stop with significant force, which can result in damage to the header and/or traction unit.

However, if the float force is too high during a harvesting operation in which the header is following the ground, then the header will not fall fast enough after striking an obstacle, or when the ground falls away, to follow the ground, which results in missed crop, and poor harvesting performance.

The present description proceeds with respect to a hydraulic (or other fluid) circuitry that provides a damped float response during lifting or lifted operations of the header. In described examples, when the header is lifted off the ground, fluid flow between the float cylinder and accumulator is restricted, which can reduce the impact of components of the header caused by sudden forces placed on the header (e.g., due to impact with obstacles, quick vertical movements of the attachment frame by the traction unit, etc.). Further, due to the reduction in impact, the structural design of the header can be modified to result in a lighter header frame.

Figure 1:
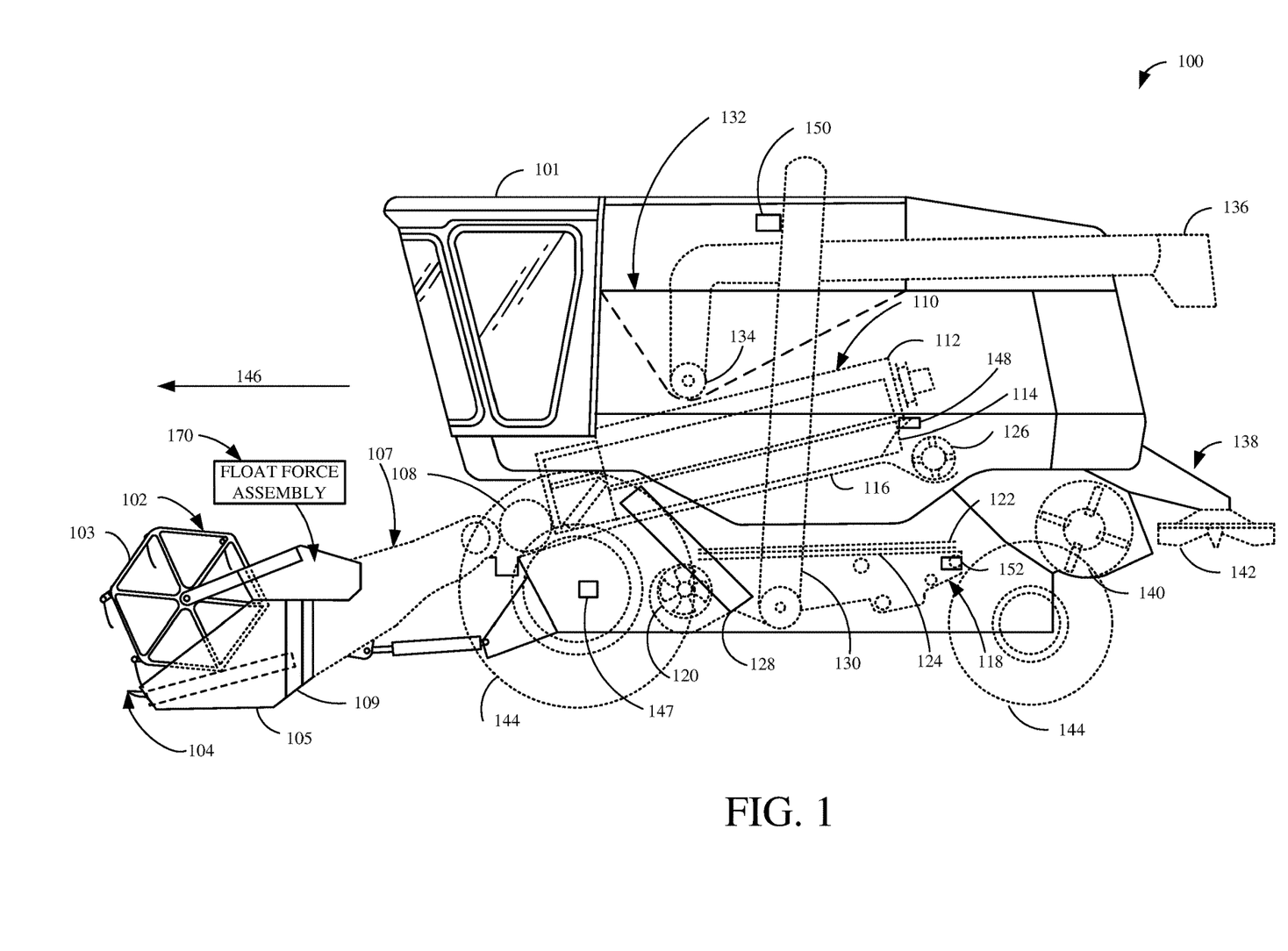
FIG. 1 is a partial pictorial, partial schematic view of one example of a combine harvester.

FIG. 1 is a partial pictorial, partial schematic, illustration of an agricultural machine 100, in an example where machine 100 is a combine harvester (also referred to as combine 100 or machine 100). It can be seen in FIG. 1 that combine 100 illustratively includes an operator compartment 101, which can have a variety of different operator interface mechanisms, for controlling combine 100. Combine 100 can include a set of front end equipment that can include header 102, and a cutter generally indicated at 104. It can also include a feeder house 107, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 107 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine (or other power source) that drives ground engaging wheels 144 or tracks, etc. It will be noted that combine 100 may also have more than one of any of the subsystems mentioned above (such as left and right cleaning shoes, separators, etc.).

Combine 100 can be equipped with removable heads that are designed for particular crops. One example, sometimes called a grain platform, is equipped with a reciprocating knife cutter bar, and features a revolving reel with metal or plastic teeth to cause the cut crop to fall into the auger once it is cut. Another example includes a cutter bar that can flex over contours and ridges to cut crops such as soybeans that have pods close to the ground.

Some headers designed for wheat, or other similar crops, include draper headers, and use a fabric or rubber apron instead of a cross auger. Often, a draper header includes one or more draper belts that move severed material, that is harvested from an agricultural field, into a header of the agricultural harvesting machine. In one example, this includes one or more draper belts on each side of the header configured to receive and move severed material to a center section of the agricultural header.

As shown in FIG. 1, header 102 has a main frame 105 and an attachment frame 109. Header 102 is attached to feeder house 107 by an attachment mechanism on attachment frame 109 that cooperates with an attachment mechanism on feeder house 107. Main frame 105 supports cutter 104 and reel 103 and is movable relative to attachment frame 109. In one example, main frame 105 and attachment frame 109 can be raised and lowered together to set a height of cutter 104 above the ground over which combine 100 is traveling. In another example, main frame 105 can be tilted relative to attachment frame 109 to adjust a tilt angle with which cutter 104 engages the crop. Also, in one example, main frame 105 can be rotated or otherwise movable relative to attachment frame 109 in order to improve ground following performance. The movement of main frame 105 together with attachment frame 109 can be driven by actuators (such as hydraulic actuators) based on operator inputs or automated inputs.

In operation, and by way of overview, the height of header 102 is set and combine 100 illustratively moves through a field in the direction indicated by arrow 146. As it moves, header 102 engages the crop to be harvested and gathers it toward cutter 104. After it is cut, the crop can be engaged by reel 103 that moves the crop to feeding tracks 154, 156 (shown in FIG. 2). Feeding tracks move the crop to the center of the header 102 and then through a center feeding track in feeder house 107 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

In one example, combine 100 has a tailings system where tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

As combine 100 moves in the direction indicated by arrow 146, it may be that the ground under header 102 contains obstacles or is uneven. Header 102 is thus provided with ground engaging elements (such as shoes or gauge wheels) that engage the surface of the ground over which combine 100 is traveling. Combine 100 is also provided with float force assembly 170. Float force assembly 170 is shown schematically in FIG. 1, and applies a float force, that is illustratively a lifting force that acts against gravity, biasing main frame 105 of header 102 in an upward direction relative to attachment frame 109. Therefore, as the ground under header 102 rises, the ground engaging elements on header 102 engage the rising ground surface and push upwardly on main frame 105. The float force applied by float force assembly 170 assists in raising header 102 up to follow the rising ground surface. In areas where the ground falls off, the weight of header 102 overcomes the float force so that it descends to its ground following set point or to a point where the ground engaging elements again engage the surface of the ground.

Similarly, if header 102, or one of the ground engaging elements on header 102, engage an obstacle (such as by striking a stone, a clump of dirt, a root ball, etc.), this impact may impart an upwardly directed force on header 102 as well. This upwardly directed force will be relatively sharp and of short duration (or pulsed). Again, as when the ground rises under header 102, the float force applied by float force assembly 170 assists in raising header 102 up, in response to the upwardly directed force imparted by the impact with the obstacle. This acts to absorb some of the impact and allow the header 102 to rise above the obstacle. The weight of the header 102 then causes it to act against the float force and return to its ground following position.

Figure 2:
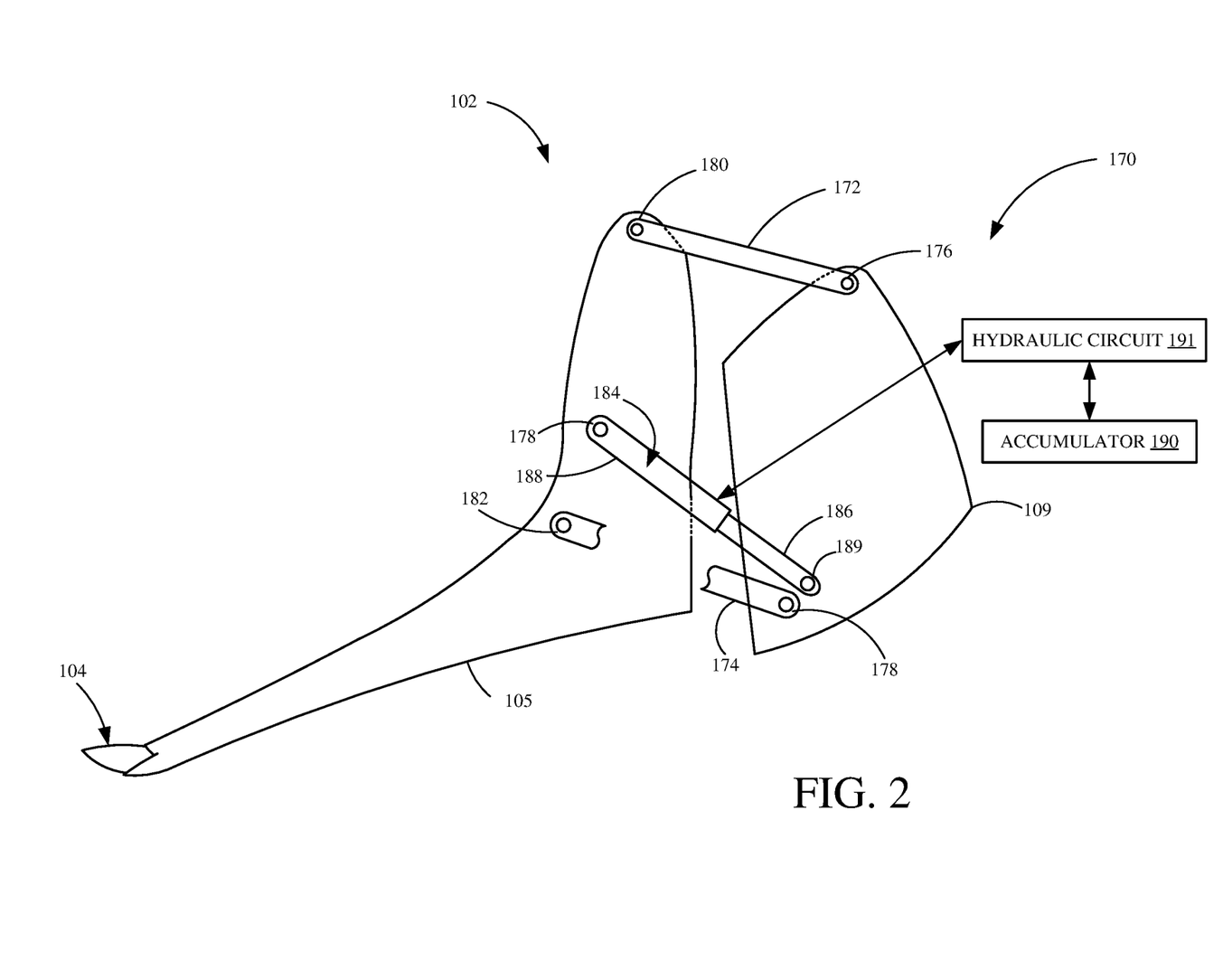
FIG. 2 shows one example of a float force assembly with an attachment frame and main frame in a first position relative to one another.

FIG. 2 shows one example of a portion of header 102 with a float force assembly 170, that applies a float force, to header 102. In the example shown in FIG. 2, some elements are similar to those shown in FIG. 1, and they are similarly numbered.

FIG. 2 shows that main frame 105, which supports cutter 104 and reel 103 (not shown in FIG. 2) is at a first position relative to attachment frame 109. Attachment frame 109 illustratively includes an attachment mechanism (not shown) that attaches to a corresponding attachment mechanism on feeder house 107. The vertical movement of main frame 105 relative to attachment frame 109 is illustratively driven by ground engaging elements, such as gauge wheels, shoes or skis (not shown) which act to raise and lower main frame 105 relative to attachment frame 109 as the ground over which the ground engaging elements move rises and falls, respectively. As mentioned above, vertical movement can also be driven by the impact of one of the ground engaging elements or the header 102 with an obstacle. In another example, main frame 105 can also be tilted relative to attachment frame 109 by a tilt actuator (also not shown).

In the example illustrated in FIG. 2, a set of control arms 172 and 174 are pivotally connected to attachment frame 109 at pivot points 176 and 178, and are pivotally attached to main frame 105 at pivot points 180 and 182, respectively. Control arms 172 and 174 control the path of movement of main frame 105 relative to attachment frame 109 when the position of main frame 105 relative to attachment frame 109 changes to follow the ground. This is just one example of an arrangement for controlling the path of movement.

Float force assembly 170 illustratively includes cylinder 184 that is pivotally connected to attachment frame 109 at pivot point 187, and that is pivotally attached to main frame 105 at pivot point 189. Hydraulic cylinder 184 has a rod portion 186 reciprocally mounted within cylinder portion 188. Assembly 170 also illustratively includes an accumulator 190. Accumulator 190 is shown schematically in FIG. 2 and is shown attached to cylinder 184, through a hydraulic circuit 191. It will be appreciated that, in one example, it can be internal to hydraulic cylinder 184. In another example, accumulator 190 and circuit 191 can be separate from hydraulic cylinder 184 and fluidically coupled to hydraulic cylinder 184. In one example, there are at least two float force assemblies 170, disposed in spaced relation to one another across the header 102. This is just an example.

Accumulator 190 can take a wide variety of different forms. For instance, the accumulator 190 can include a diaphragm or other pressure transmitting mechanism. The diaphragm can have one side in fluid communication with the rod end of cylinder 184 and has a compressible fluid or a compressible gas disposed on its other side. When rod portion 186 is extended further out cylinder portion 188, the pressure increases in the rod end of cylinder 184, and the diaphragm compresses the compressible medium in accumulator 190, thus increasing the pressure in accumulator 190. When rod portion 186 is further retracted into of cylinder portion 188, then the pressure in the base end of cylinder 184 is reduced, and the compressible medium expands, pushing against the diaphragm (or other movable member) so that the pressure in accumulator 190 is reduced and hydraulic fluid is drawn from the accumulator 190 into the rod end of the cylinder.

Figure 3:
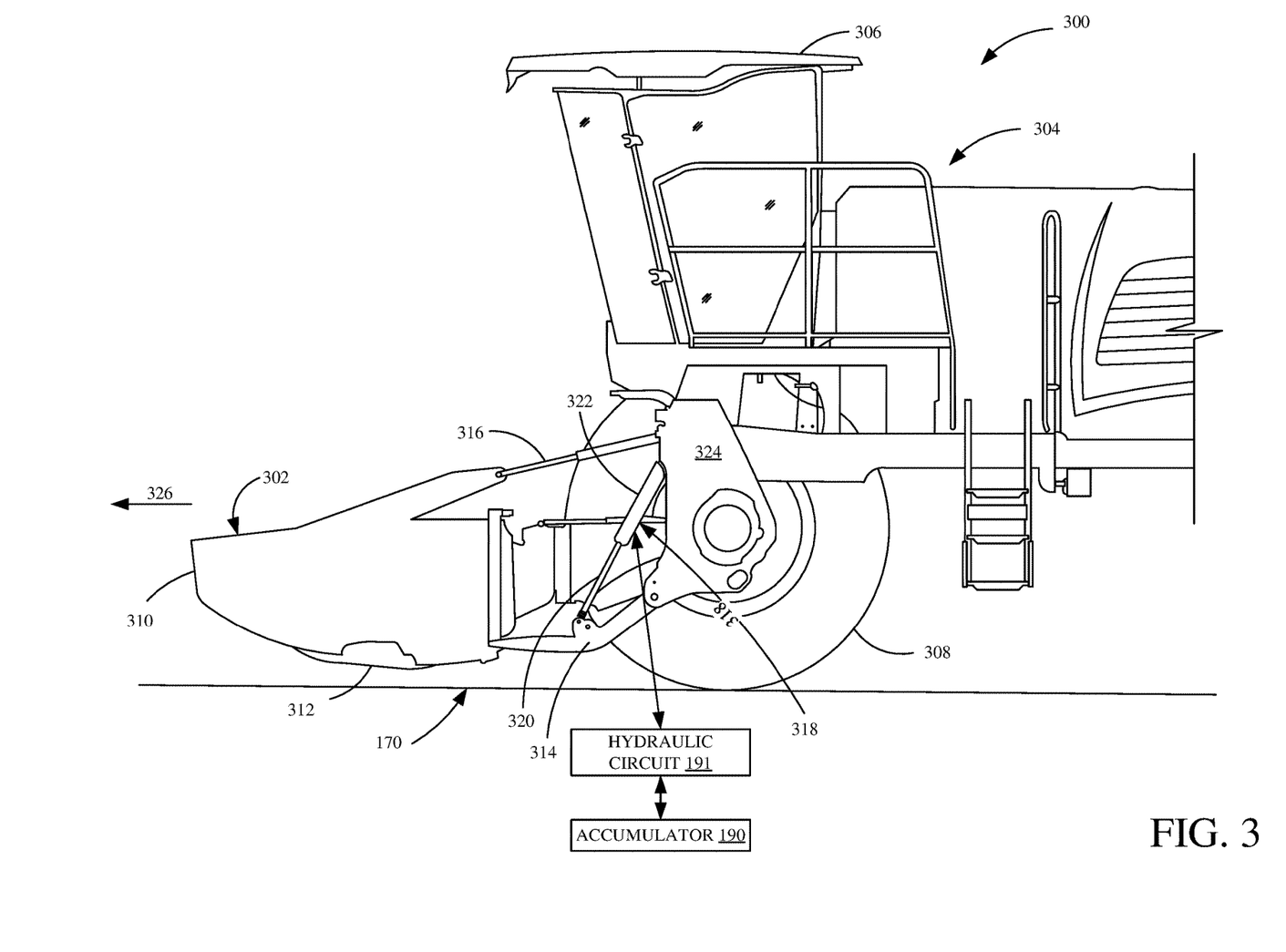
FIG. 3 is a partial schematic, partial pictorial illustration of one example of a windrower.

FIG. 3 is a partial pictorial, partial schematic illustration of a portion of a mobile machine 300, in which mobile machine 300 is an agricultural windrower. In the example shown in FIG. 3, machine 300 has a header 302 that is coupled to, and supported by, a traction unit 304. Traction unit 304 has an operator compartment 306 and an engine or other power source that drives movement of ground engaging elements (e.g., wheels) 308. The power source can also include a hydraulic system (or other power system) that provides power to functionality for header 302.

Header 302 illustratively includes a header main frame 310 that supports cutter 312. The header main frame 310 is supported for movement, relative to traction unit 304, by lift arm 314. Lift arm 314 can be moved (e.g., lifted and lowered, relative to traction unit 304) by actuating a lift cylinder (or a set of lift cylinders), not shown in FIG. 3. In addition, header 302 can be tilted by actuating tilt cylinder 316.

FIG. 3 also shows that float cylinder 318 (or a set of float cylinders) are coupled between the main frame of 310 of header 302 and the traction unit 304 to exert a lifting force on the header 302 relative to traction unit 304. In the example shown in FIG. 3, float cylinder 318 has its rod end 320 coupled to lift arm 314 and its base end 322 coupled to a frame 324 of traction unit 304. Also, as with the float assembly 170 shown in FIG. 2, float cylinder 318 is also coupled to accumulator 190 through hydraulic circuit 191.

In operation, an operator sets header 302 to a desired height so that cutter 312 engages crop to be cut. As machine 300 moves generally in the direction indicated by arrow 326, cutter 312 engages and cuts the crop. The cut crop is gathered centrally within main frame 310 and dropped in a windrow at the exit end of header 302.

Accumulator 190 illustratively provides hydraulic fluid under pressure to the rod end of float cylinder 318 to exert the lifting force on header 302. When there is an upwardly directed force imparted on header 302 (such as when it hits an obstacle), then the rod of cylinder 318 retracts into the base end thus drawing fluid from accumulator 190, through hydraulic circuit 191, as header 302 moves upwardly in response to the imparted force. When header 302 begins to descend to its original position (its position before the upwardly directed force was imparted), cylinder 318 forces hydraulic fluid from its rod end, back into accumulator 190, through hydraulic circuit 191.

Figure 4:
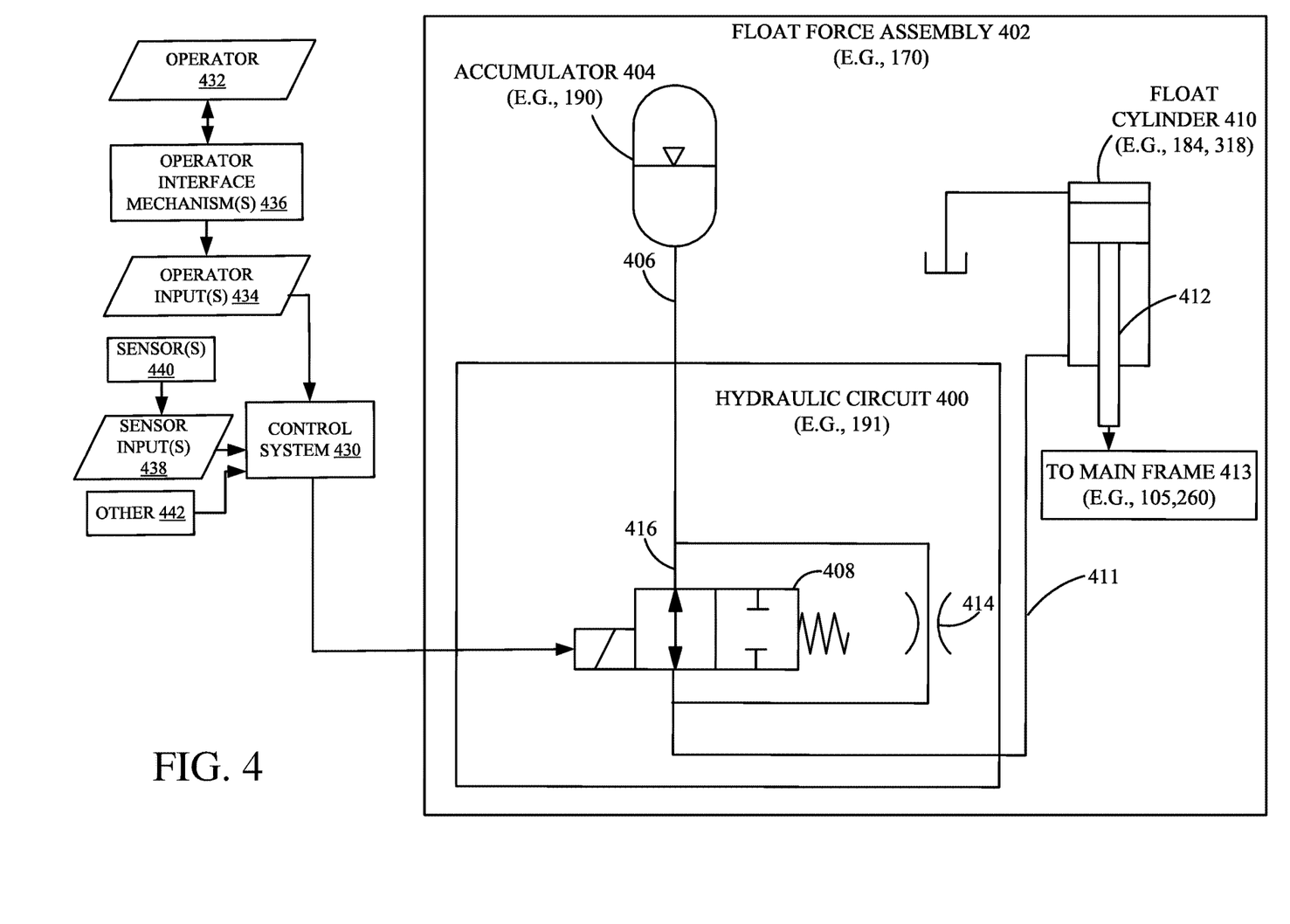
FIG. 4 is a schematic diagram of one example of a hydraulic circuit for a float force assembly.
Figure 5:
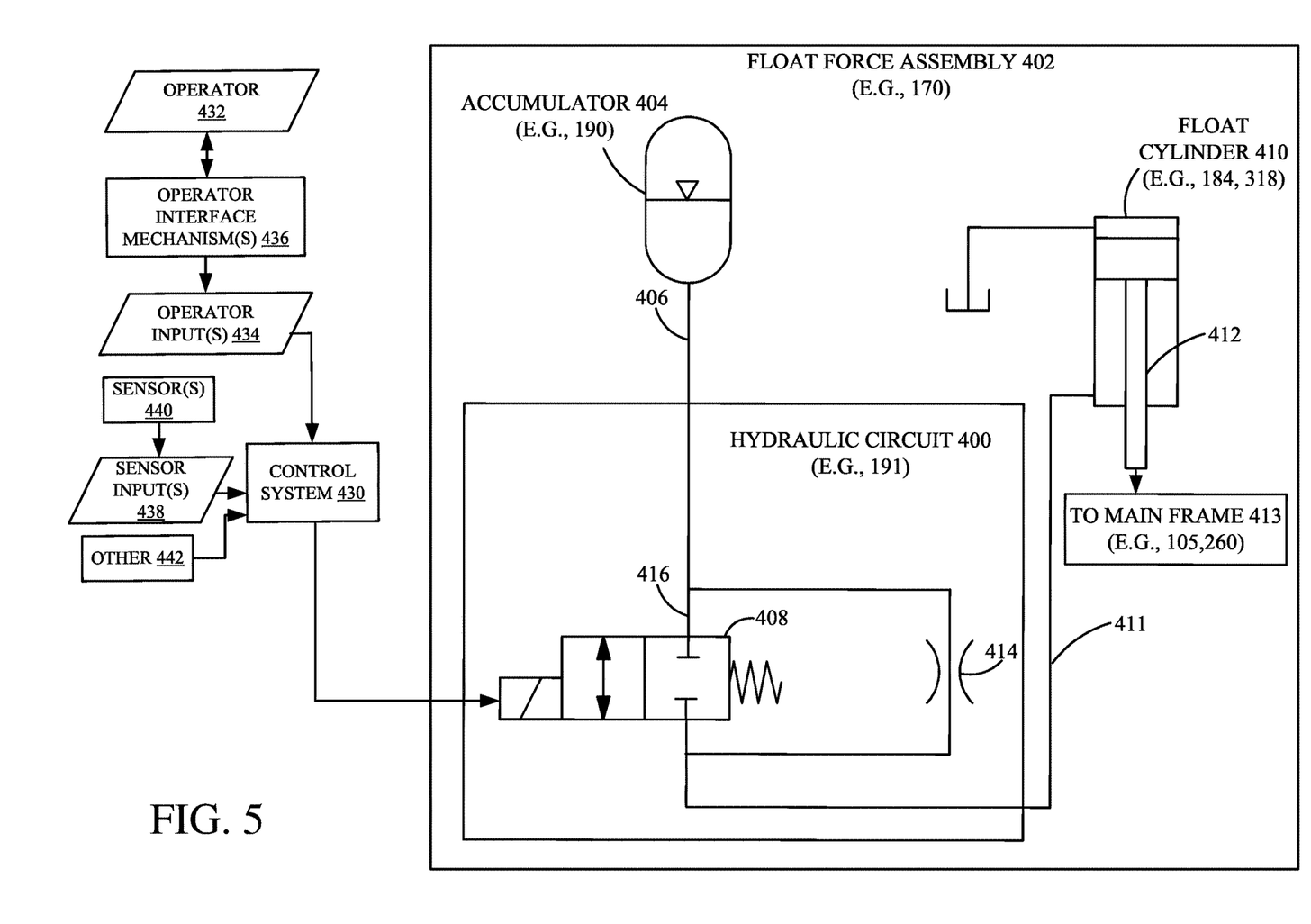
FIG. 5 is a schematic diagram of the hydraulic circuit shown in FIG. 4, with a valve in a closed position to provide a restricted fluid flow for a damped float response.

FIGS. 4 and 5 are schematic diagrams of one example of a hydraulic circuit 400 (such as circuit 191) of a float force assembly 402 (such as assembly 170) for a header (such as header 102, 302). Hydraulic circuit 400 is configured to provide a damped float response during lifting or lifted operations of the header. Illustratively, this has the effect of damping out the response of float force assembly 402 to pulse-type forces during lifting operations of the header (e.g., while the attachment frame is being lifted by the traction unit) and/or pulse-type forces caused by impact with obstacles while the traction unit is moving across a terrain with the header in a raised or lifted position.

FIG. 4 shows that an accumulator 404 is hydraulically coupled through a hydraulic fluid conduit defined by a tube 406 (the tube and defined conduit may be referred to hereafter as conduit 406) and a control valve 408 to a float cylinder 410. An example of accumulator 404 includes, but is not limited to, accumulator 190 discussed above. Further, examples of float cylinder 410 include, but are not limited to, float cylinders 184 and 318 discussed above.

The rod end of float cylinder 410 is connected to a header main frame 413, such as main frame 105 or 310 discussed above with respect to FIGS. 2 and 3. The rod end of the cylinder 410 is hydraulically coupled to accumulator 404 through a hydraulic fluid conduit defined by a tube 411 (the tube and defined conduit may be referred to hereinafter as conduit 411). The base end of cylinder 410 is connected to relative to a traction unit, such an attachment frame on a combine, and can be hydraulically coupled to a tank in a hydraulic system of the combine. During a normal, non-lifted operation (i.e., the header is on the ground), valve 408 is in the open position (moved to the right in FIG. 5), so that hydraulic fluid can pass through valve 408 substantially unrestricted. As such, when the header receives an impact from an obstacle, there will be an upwardly directed force imparted on the rod 412 of cylinder 410. This will cause rod 412 to move upwardly, retracting into cylinder 410, and thus drawing hydraulic fluid from accumulator 404.

FIG. 4 shows that hydraulic circuit 400 includes a flow restricting feature 414, through which hydraulic fluid flow is controlled by control valve 408. Feature 414 is disposed in parallel with a portion 416 of the flow path in which control valve 408 is disposed. Feature 414 is configured to restrict the flow of fluid through conduits 406 and 411. Accordingly, when control valve 408 is in the open position shown in FIG. 4, the hydraulic fluid flows between accumulator 404 and float cylinder 410 substantially unrestricted. However, when control valve 408 is in the closed position (shown in FIG. 5—i.e., control valve 408 is moved to the left), the fluid flow is forced through feature 414, resulting in a restricted flow between accumulator 404 and float cylinder 410. As such, the pressure will not equalize between accumulator 404 and float cylinder 410 as quickly (due to the restriction of feature 414).

In the example of FIGS. 4 and 5, feature 414 comprises a fixed orifice (also referred to as fixed orifice 414). Of course, other types of flow restricting mechanisms can be utilized. Fixed orifice 414 has an orifice opening that is smaller than the conduit defined by tubes 406 and 411, on either side of the orifice 414. Therefore, orifice 414 illustratively restricts the flow of hydraulic fluid through conduit 406 by a fixed amount. Further, because the feature 414 is a fixed orifice in this example, it restricts the flow of hydraulic fluid through hydraulic conduit 406 in both directions (both when the header is ascending and descending). It will be noted that orifice 414 can be selected to achieve different effects. That is, its physical size and restrictive properties can be selected to achieve a desired performance. If the orifice is larger (with less flow restriction), then the system will tend to absorb less impact than smaller, more restrictive orifice sizes.

Figure 6:
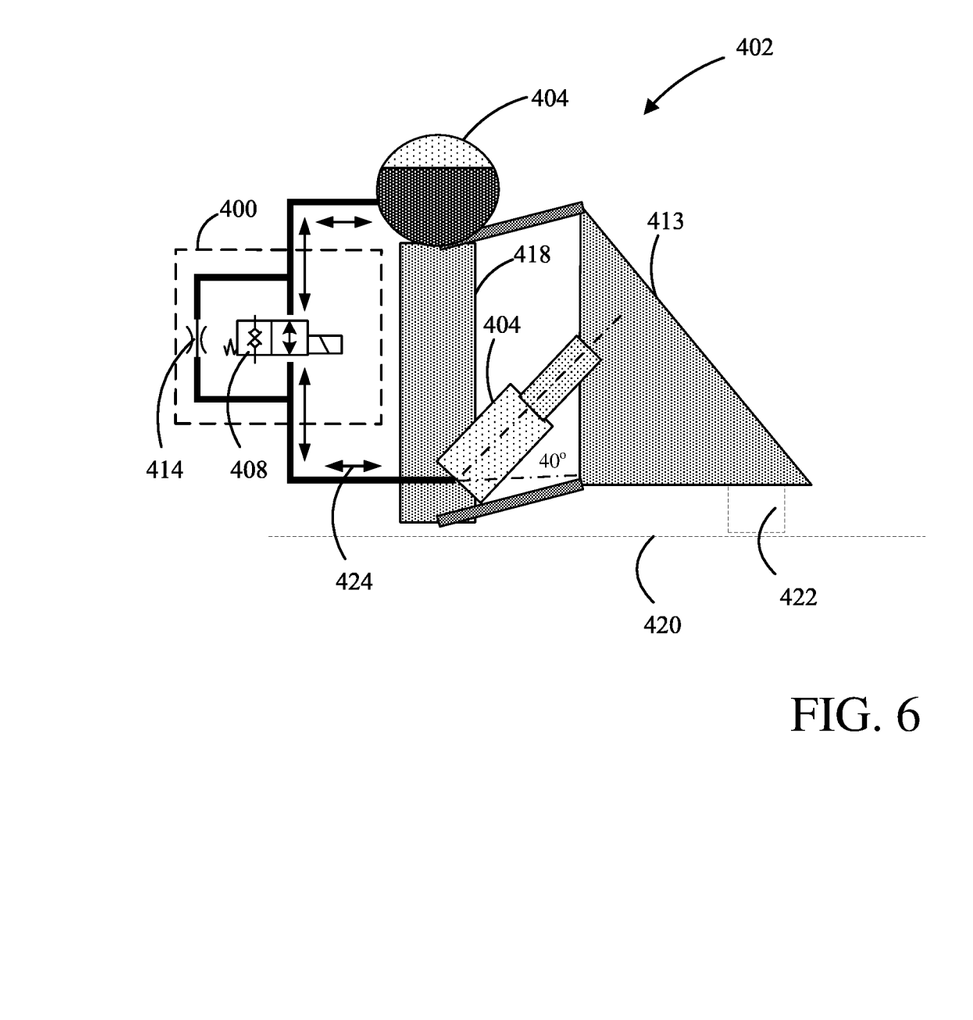
FIG. 6 illustrates a header in a ground-following (i.e., non-lifted) position, in one example.
Figure 7:
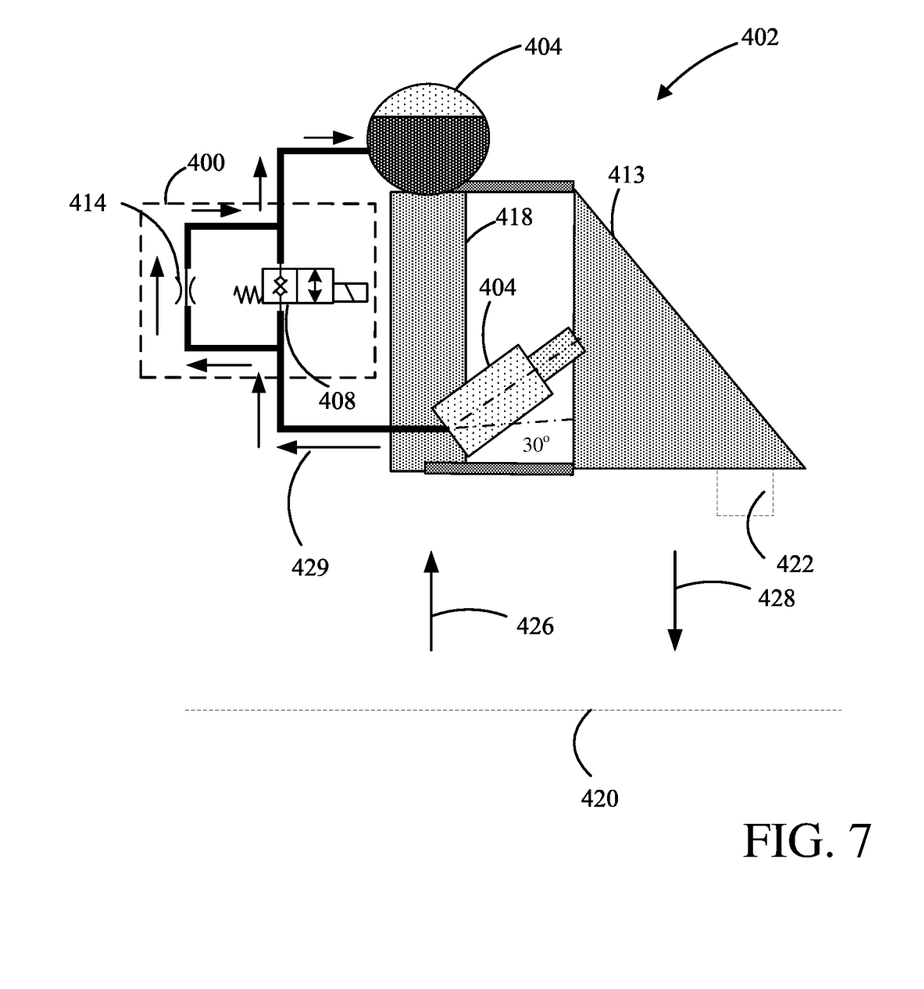
FIG. 7 illustrates a header during or after a lifting operation, in one example.

FIGS. 6 and 7 are schematic illustrations of float force assembly 402 during different header operations. FIG. 6 illustrates the header in a ground-following (i.e., non-lifted) position, such as a normal harvesting operation. FIG. 7 illustrates the header during or after a lifting operation, in which the header is raised to a position above the ground.

As shown in FIG. 6, the header is positioned (i.e., by the traction unit positioning attachment frame 418) such that a cutter is located a desired distance above the ground 420 over which the combine is travelling. As discussed above, the header can be can include ground engaging elements (generally represented at block 422) that engage and support the main frame 413 on the ground 420. When an upwardly directed force is imparted on main frame 413 (such as when the main frame 413 or ground engaging element 422 strikes an obstacle on the ground, or the ground itself rises) the main frame 413 rises relative to attachment frame 418, assisted by the float force provided by float cylinder 410. Accordingly, hydraulic fluid is drawn out of accumulator 404 and through hydraulic circuit 400 towards float cylinder 410. Similarly, when main frame 413 falls relative to attachment frame 418, hydraulic fluid is pushed through hydraulic circuit 400 toward accumulator 404. In both cases, the fluid flow (represented by arrows 424) through circuit 400 is substantially unrestricted.

When a lifting operation is to be performed, control valve 408 is closed as shown in FIG. 7. Attachment frame 418 is then lifted by the traction unit away from the ground 420, as represented by arrow 426. This causes the main frame 413 to fall, as represented by arrow 428. However, the fluid flow (represented by arrows 429) through circuit 400, caused by retraction of the rod end of float cylinder 410, is forced through the flow restricting feature 414 due to control valve 408 being in the closed position. Fluid flow 429 is thus restricted compared to flow fluid 424. This results in a reduced, or dampened, lowering response of the main frame 413. That is, in the restricted control valve state of FIG. 7, main frame 413 falls at a reduced rate compared to the unrestricted control valve state of FIG. 6.

Referring again to FIGS. 4 and 5, when float force assembly 402 is manually controlled, an operator 432 can use a suitable mechanism to control hydraulic circuit 400. In an example, a control signal is generated by a control system 430, and controls (e.g., actuating a mechanical actuator, etc.) the position of control valve 408.

In one example, control system 430 includes hardware items (such as processors and associated memory, or other processing components) that perform the associated functions. In addition, the system can be comprised of software that is loaded into a memory and is subsequently executed by a processor or server, or other computing component. The system can also be comprised of different combinations of hardware, software, firmware, etc. These are only some examples of different structures that can be used to form control system 430. Other structures can be used as well.

In one example, control system 430 can detect operator inputs 434 that are provided by operator 432 through operator interface mechanism(s) 436. Control system 430 can also detect sensor input(s) 438 that are provided from one or more various sensors 440. For instance, control system 430 can automatically detect that the combine is in a transport mode. Control system 430 can receive other inputs 442 as well. Control system 430 can then actuate control valve 408 between the open and closed positions shown in FIGS. 4 and 5, respectively, based on one or more of those inputs. This can be done in a wide variety of different ways, and a number of examples will now be described.

In one example, when the operator is providing an input to raise the header, control system 430 can detect that operator input and not only control the lift actuator that is lifting the header, but it can also control the valve 408 to close it up, so that the fluid flow from float cylinder 410 to accumulator 404 (caused by the increased force by main frame 413 on float cylinder 410) is restricted by flow restricting feature 414.

In addition, sensor inputs 438 can be provided by sensors that sense the position or direction of movement or other characteristics of the header. For instance, when the header receives a bump impact, and begins to rise, this can be detected by the sensors 440 and provided as a sensor input 438 to control system 430. As the header continues to rise, control system 430 may control valve 408 to close, to increase the flow restriction.

Example 1 is a header assembly for an agricultural harvesting machine having a traction unit, the header assembly comprising:
　a cutter;
　a main frame that supports the cutter;
　a float cylinder configured to be coupled between the main frame and the traction unit; an accumulator; and
　fluidic circuitry that fluidically couples the accumulator to the float cylinder, wherein the fluidic circuitry is configured to:
　　provide a first flow of pressurized fluid under pressure to the float cylinder, so the float cylinder exerts a float force on the main frame; and
　　based on a control input that corresponds to a lifting operation of the header assembly, provide a restricted flow of fluid, that is restricted relative to the first flow, between the float cylinder and the accumulator.

Example 2 is the header assembly of any or all previous examples, wherein the fluidic circuitry comprises a valve mechanism that is actuatable, based on the control input, between a first position that permits the first flow through a first fluid conduit and a second position that inhibits flow through the first fluid conduit.

Example 3 is the header assembly of any or all previous examples, wherein the fluidic circuitry comprises a second fluid conduit disposed in parallel with the first fluid conduit and having a flow restricting feature configured to provide the restricted flow between the float cylinder and the accumulator when the valve mechanism is in the second position.

Example 4 is the header assembly of any or all previous examples, wherein the flow restricting feature comprises a flow restricting orifice in the second fluid conduit between the float cylinder and the accumulator.

Example 5 is the header assembly of any or all previous examples, wherein the flow restricting orifice defines an orifice opening that is smaller than the first fluid conduit.

Example 6 is the header assembly of any or all previous examples, wherein the flow restricting orifice comprises a fixed orifice that has a fixed size orifice opening.

Example 7 is the header assembly of any or all previous examples, and further comprising a control system configured to operate the fluidic circuitry in a first mode that provides the first flow of pressurized fluid under pressure, and in a second mode that provides the restricted flow of fluid.

Example 8 is the header assembly of any or all previous examples, wherein the control input is generated based on an operator input.

Example 9 is the header assembly of any or all previous examples, wherein the control input is generated based on a sensed direction of movement of the header assembly.

Example 10 is the header assembly of any or all previous examples, wherein the lifting operation lifts the header assembly off the ground.

Example 11 is the header assembly of any or all previous examples, and further comprising an attachment frame movably coupled to the main frame, wherein the attachment frame is coupled to the traction unit and the float cylinder exerts a float force on the main frame relative to the attachment frame.

Example 12 is a float force assembly for a harvesting machine header that is attached to a harvesting machine traction unit, the float force assembly comprising:
　an accumulator;
　fluidic circuitry that fluidically couples the accumulator to a float cylinder coupled between the harvesting machine traction unit and the harvesting machine header, wherein the fluidic circuitry comprises a valve mechanism that is actuatable between a first position and a second position, wherein
　　when the valve mechanism is in the first position, the fluidic circuitry provides a first flow of pressurized fluid under pressure to the float cylinder, so the float cylinder exerts a float force on the main frame; and
　　when the valve mechanism is in the second position, the fluidic circuitry provide a restricted flow of fluid, that is restricted relative to the first flow, between the float cylinder and the accumulator.

Example 13 is the float force assembly of any or all previous examples, wherein the fluidic circuitry comprises:

a first fluid conduit that is controlled by the valve mechanism; and a second fluid conduit disposed in parallel with the first fluid conduit and having a flow restricting feature configured to provide the restricted flow between the float cylinder and the accumulator when the valve mechanism is in the second position.

Example 14 is the float force assembly of any or all previous examples, wherein the flow restricting feature comprises a flow restricting orifice in the second fluid conduit between the float cylinder and the accumulator, the flow restricting orifice defining an orifice opening that is smaller than the first fluid conduit.

Example 15 is the float force assembly of any or all previous examples, wherein the valve mechanism is actuated, based on a control input, between the first position and the second position during a lifting operation that lifts the harvesting machine header.

Example 16 is the float force assembly of any or all previous examples, and further comprising a control system configured to operate the fluidic circuitry in a first mode that provides the first flow of pressurized fluid under pressure, and in a second mode that provides the restricted flow of fluid.

Example 17 is the float force assembly of any or all previous examples, wherein the control input is generated based on an operator input.

Example 18 is the float force assembly of any or all previous examples, wherein the control input is generated based on a sensed direction of movement of the header assembly.

Example 19 is the float force assembly of any or all previous examples, and further comprising an attachment frame movably coupled to the main frame, wherein the attachment frame is coupled to the traction unit and the float cylinder exerts a float force on the main frame relative to the attachment frame.

Example 20 is a header for a traction unit of a harvesting machine, the header comprising:
- a cutter;
- an attachment frame configured to couple the header to the traction unit;
- a main frame that supports the cutter and is movably coupled to the attachment frame;
- a float cylinder;
- an accumulator that is fluidically coupled to the float cylinder through a first fluid conduit that provides a first flow of pressurized fluid under pressure to the float cylinder, so the float cylinder exerts a float force on the main frame relative to the attachment frame;
- a valve mechanism that is actuatable between a first position that permits the first flow through the first fluid conduit and a second position that inhibits flow through the first fluid conduit; and
- a second fluid conduit disposed in parallel with the first fluid conduit and having a flow restricting feature configured to provide the restricted flow between the float cylinder and the accumulator when the valve mechanism is in the second position.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A header assembly for an agricultural harvesting machine having a traction unit, the header assembly comprising:
   a cutter;
   a main frame that supports the cutter;
   a float cylinder;
   an accumulator; and
   fluidic circuitry that fluidically couples the accumulator to the float cylinder and includes
      a flow restricting feature, the fluidic circuitry having
      a first configuration in which a first flow of pressurized fluid under pressure to the float cylinder exerts a float force on the main frame relative to the traction unit; and
      a second configuration corresponding to a lifting operation in which the main frame is lifted relative to the traction unit, wherein, when in the second configuration, the flow restricting feature restricts a second flow of fluid from the float cylinder to the accumulator.

2. The header assembly of claim 1, wherein
   the fluidic circuitry comprises:
      a first fluid conduit, and
      a valve mechanism that is actuatable, based on the control input, between a first position and a second position,
   the first position of the valve mechanism permits the first flow through the first fluid conduit, and
   the second position inhibits flow through the first fluid conduit and provides the second flow of fluid through the flow restricting feature.

3. The header assembly of claim 2, wherein the fluidic circuitry comprises:
   a second fluid conduit disposed in parallel with the first fluid conduit and having the flow restricting feature configured to provide the restricted flow between the float cylinder and the accumulator when the valve mechanism is in the second position.

4. The header assembly of claim 3, wherein the flow restricting feature comprises a flow restricting orifice in the second fluid conduit between the float cylinder and the accumulator.

5. The header assembly of claim 4, wherein the flow restricting orifice defines an orifice opening that is smaller than the first fluid conduit.

6. The header assembly of claim 5, wherein the flow restricting orifice comprises:
   a fixed orifice that has a fixed size orifice opening.

7. The header assembly of claim 5, and further comprising:
   a control system configured to operate the fluidic circuitry in the first configuration that provides the first flow of pressurized fluid under pressure, and in the second configuration that provides the restricted flow of fluid.

8. The header assembly of claim 7, wherein the control input is generated based on an operator input.

9. The header assembly of claim 7, wherein the control input is generated based on a sensed direction of movement of the header assembly.

10. The header assembly of claim 1, wherein the lifting operation lifts the header assembly off the ground.

11. The header assembly of claim 1, and further comprising:
    an attachment frame movably coupled to the main frame, wherein the attachment frame is coupled to the traction unit and the float cylinder exerts a float force on the main frame relative to the attachment frame.

12. A float force assembly for a harvesting machine header that is attached to a harvesting machine traction unit, the float force assembly comprising:
   an accumulator; and
   fluidic circuitry that fluidically couples the accumulator to a float cylinder coupled between the harvesting machine traction unit and the harvesting machine header, wherein the fluidic circuitry comprises a flow restricting feature and a valve mechanism that is actuatable between a first position and a second position, wherein
      when the valve mechanism is in the first position, the fluidic circuitry provides a first flow of pressurized fluid under pressure to the float cylinder, so the float cylinder exerts a float force on the main frame; and
      when the valve mechanism is in the second position, the flow restricting feature provides a restricted flow of fluid, that is restricted relative to the first flow, from the float cylinder to the accumulator.

13. The float force assembly of claim 12, wherein the fluidic circuitry comprises:
   a first fluid conduit that is controlled by the valve mechanism; and
   a second fluid conduit disposed in parallel with the first fluid conduit and having a flow restricting feature configured to provide the restricted flow between the float cylinder and the accumulator when the valve mechanism is in the second position.

14. The float force assembly of claim 13, wherein the flow restricting feature comprises a flow restricting orifice in the second fluid conduit between the float cylinder and the accumulator, the flow restricting orifice defining an orifice opening that is smaller than the first fluid conduit.

15. The float force assembly of claim 12, wherein the valve mechanism is actuated, based on a control input, between the first position and the second position during a lifting operation that lifts the harvesting machine header.

16. The float force assembly of claim 15, and further comprising:
   a control system configured to operate the fluidic circuitry in a first mode that provides the first flow of pressurized fluid under pressure, and in a second mode that provides the restricted flow of fluid.

17. The float force assembly of claim 16, wherein the control input is generated based on an operator input.

18. The float force assembly of claim 16, wherein the control input is generated based on a sensed direction of movement of the header assembly.

19. The header assembly of claim 12, and further comprising:
   an attachment frame movably coupled to the main frame, wherein the attachment frame is coupled to the traction unit and the float cylinder exerts a float force on the main frame relative to the attachment frame.

20. A header for a traction unit of a harvesting machine, the header comprising:
   a cutter;
   an attachment frame configured to couple the header to the traction unit;
   a main frame that supports the cutter and is movably coupled to the attachment frame;
   a float cylinder;
   an accumulator that is fluidically coupled to the float cylinder through a first fluid conduit that provides a first flow of pressurized fluid under pressure to the float cylinder, so the float cylinder exerts a float force on the main frame relative to the attachment frame;
   a valve mechanism that is actuatable between a first position that permits the first flow through the first fluid conduit and a second position that inhibits flow through the first fluid conduit; and
   a second fluid conduit disposed in parallel with the first fluid conduit and having a flow restricting feature configured to provide the restricted flow between the float cylinder and the accumulator when the valve mechanism is in the second position.

* * * * *